Feb. 14, 1961   G. H. RÖHM   2,971,413
LATHE POINT
Filed Jan. 20, 1958

INVENTOR
Günther Horst RÖHM 2,971,413
LATHE POINT

Günther Horst Röhm, Muhlstrasse 9, Sontheim, Germany

Filed Jan. 20, 1958, Ser. No. 710,136

Claims priority, application Germany Jan. 24, 1957

2 Claims. (Cl. 82—33)

This invention relates to a lathe center and more particularly to a device which is adapted to engage the end of a work piece at the center by a center point and at points spaced around the center by a plurality of gripping lathe points.

Various embodiments of lathe points of the above mentioned type have been known in the art. In certain of these devices the lathe center point and gripping projections are mounted in a common support. Generally there is provided a chamber filled with a liquid which serves as a resilient support means for the lathe points. The difficulty with an arrangement such as this is that the entire unit must be replaced when working with different sized work pieces. Devices are also known wherein the gripping projections are mounted on a separate plate and this plate is moveably mounted on the support for the center lathe point. With such an arrangement a single center support may be used and various sized plates and associated gripping projections may be used for various sized work pieces. However, as the gripping projections are fixedly mounted on the plate they cannot move independently of one another and consequently a work piece may not be held as firmly particularly where the work piece has an uneven end surface.

The present invention provides a device which combines all of the advantages of the prior art devices and yet possesses none of the disadvantages thereof. The gripping projections surrounding the lathe center point are mounted in a separable member so that different units can be substituted for different sized work pieces and yet each of the gripping projections is moveable independently of the other projections and independently of the center point.

The center point is slidably mounted in a support and is spring supported. The gripping projections which surround the center point are mounted in a separable head and this head is provided with a pressure chamber communicating with the end of the bores receiving the gripping projections and in this manner each of the gripping projections is independently supported by hydraulic pressure. The head or plate supporting the gripping projections fits over a reduced end portion on the support for the center point and may be readily removed and replaced by a unit in which the gripping projections have a larger or smaller center distance. Thus, the saved center lathe point may be used for work pieces of varying diameters. As each gripping projection is independently supported by hydraulic pressure the unit operates effectively even where slanting for uneven end surfaces are provided on the work piece. The support for the center point is elongated and extends into proximity to the place where the center point projects into engagement with the work piece. Such an arrangement more accurately centers the work piece and the spring mounting for the center point insures proper yielding to radial pressures.

An object of the present invention is to provide a lathe centering means in which the gripping projections surrounding the center point are removeable from the center point and are supported for independent movement.

Another object of the present invention is to provide a lathe centering device in which the gripping projections are supported by hydraulic pressure and are mounted in a common support which is removeable from the support for the center point so as to provide for gripping work pieces of varying sizes.

Other objects and many of the attendant advantages of the present invention will become apparent upon consideration of the following detailed specification in connection with the accompanying drawing.

Figure 1:
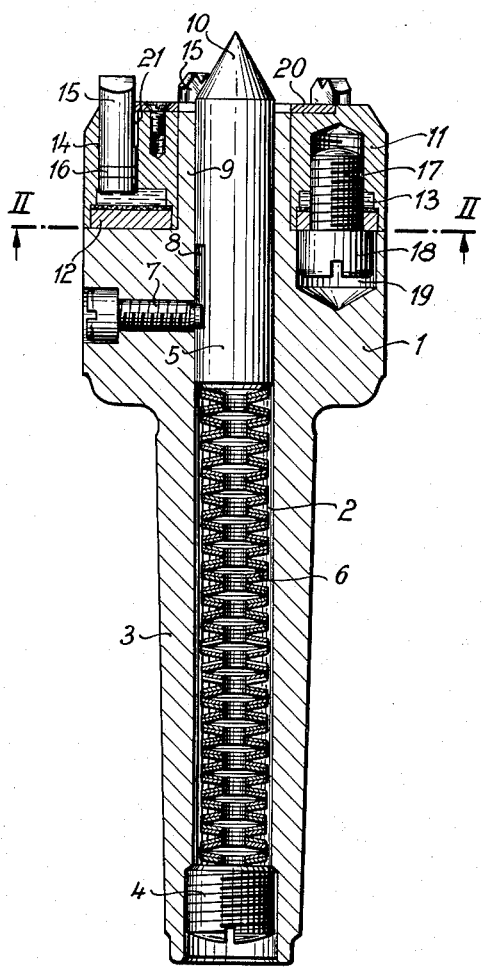
Fig. 1 is a longitudinal sectional view showing the improved centering device.

Referring now more specifically to the drawing wherein like numerals indicate like parts throughout the several views there is shown at 1 a center point casing which is provided with a boring 2. The casing 1 has a shaft portion 3 and the end of the boring is closed by means of a screw 4. The center point 5 is slidably supported in the other end of the boring tube and a spring means 6 is disposed within the boring and forces the center point 5 outwardly of the casing. A screw 7 is mounted in the casing 1 and this screw has an end portion engaging a slot 8 in the center point 5. The inner engagement of the screw 7 and slot 8 serves to limit the extent of movement of the center point 5.

Figure 2:
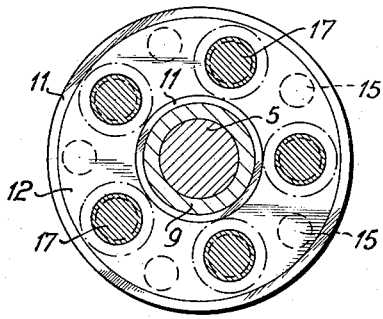
Fig. 2 is a sectional view along the line 2—2 of Fig. 1.
Figure 3:
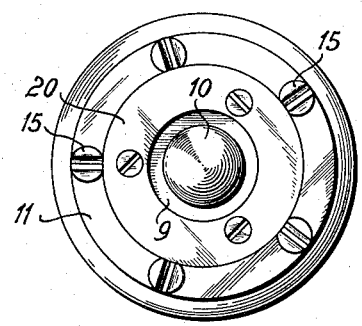
Fig. 3 is an end view showing the center point and the gripping projections.

The casing 1 has a pipe shaped extension 9 which reaches to a point adjacent the end of the center point 5. A head member 11 is slidable on this extension 9 and this head member 11 serves to support the gripping projections. The head 11 has a recessed portion forming a pressure chamber 13 and this pressure chamber is closed by means of a ring plate 12 more clearly shown in Fig. 2. The ring plate 12 is retained in position over the pressure chamber by means of bolts 17 having enlarged heads 18. The heads 18 engage in recesses 19 in the casing 1 so as to prevent the head 11 from turning on the extension 9.

Within the head 11 there are provided a plurality of radial borings 14 which communicate with the pressure chamber 13 and within these borings are slidably disposed the gripping projections 15. A seal is provided between the pressure chamber and the projections 15 by means of sealing rings 16. A ring plate 20 is mounted on the end face of the head 11 and this ring plate has an outer edge portion which engages in notches 21 in the gripping projections 15. This engagement between the outer edge of the plate 20 and the gripping projections provides a means for limiting the extent of movement of the gripping projections within the bores.

When in use on a lathe the point 10 engages the work piece and yields under the spring pressure until the teeth of the gripping projections 15 engage the frontal surface of the work piece. In uneven or slanting surfaces of the work piece the height of the gripping projections is equalized by the hydraulic pressure of the oil or other substance within the pressure chamber 13. The head 11 is supported on the casing 1 by means of the screwheads 18 but it is obvious that this head may be removed from the casing and another head substituted having a larger or smaller distance between the gripping projections and the center point.

Obviously many modifications and variations of the present invention are possible in light of the above teachings. What is claimed as new and desired to be secured by Letters Patent is:

1. In combination with a lathe center casing having a bore in an end face thereof for slidable mounting of a center point and an annular groove in said end face coaxial with the bore and a plurality of recesses in the bottom of the groove, an annular gripping head slidably engaged in the groove and having an annular chamber therein coaxial with the bore in the casing and filled with pressure fluid, means on one end thereof engaged in the recesses in the casing to prevent relative rotation between the head and the casing, a series of borings in the other end thereof spaced symmetrically about the bore in the casing and communicating with the chamber, and a corresponding number of gripping elements slidably mounted in the borings and hydraulically supported by the fluid in the chamber.

2. The combination according to claim 1 wherein the means on the first-mentioned end of the head for preventing relative rotation between it and the casing is a series of bolts having their heads engaged in the recesses, and the annular chamber in the gripping head is defined by an annular recess in said first-mentioned end of the head and an annular plate secured over the annular recess by said series of bolts.

References Cited in the file of this patent

UNITED STATES PATENTS

| | | |
|---|---|---|
| 2,545,852 | Kurzweil | Mar. 20, 1951 |
| 2,576,704 | Smith | Nov. 27, 1951 |

FOREIGN PATENTS

| | | |
|---|---|---|
| 678,885 | Great Britain | Sept. 10, 1952 |
| 409,864 | Italy | Mar. 5, 1945 |
| 79,846 | Netherlands | Dec. 15, 1955 |
| 918,480 | Germany | Dec. 13, 1954 |
| 1,086,522 | France | Aug. 11, 1954 |